(12) United States Patent
Sun et al.

(10) Patent No.: US 11,614,399 B2
(45) Date of Patent: Mar. 28, 2023

(54) SYSTEM AND METHOD FOR AUTOMATIC ONLINE MONITORING OF DIMETHYL SULFIDE IN ENVIRONMENT

(71) Applicant: TIANJIN UNIVERSITY OF SCIENCE AND TECHNOLOGY, Tianjin (CN)

(72) Inventors: Jun Sun, Tianjin (CN); Liying Peng, Tianjin (CN); Yu Guo, Tianjin (CN); Dai Jia, Tianjin (CN)

(73) Assignee: Tianjin University of Science and Technology

( * ) Notice: Subject to any disclaimer, the term of this patent is extended or adjusted under 35 U.S.C. 154(b) by 306 days.

(21) Appl. No.: 17/107,594

(22) Filed: Nov. 30, 2020

(65) Prior Publication Data

US 2021/0181094 A1    Jun. 17, 2021

(30) Foreign Application Priority Data

Dec. 12, 2019 (CN) .......................... 201911272397.9

(51) Int. Cl.
| | | |
|---|---|---|
| G01N 21/31 | (2006.01) | |
| G01N 21/01 | (2006.01) | |
| G01N 21/17 | (2006.01) | |
| G01N 27/622 | (2021.01) | |

(52) U.S. Cl.
CPC ............ *G01N 21/31* (2013.01); *G01N 21/01* (2013.01); *G01N 21/1717* (2013.01); *G01N 27/622* (2013.01); *G01N 2021/0118* (2013.01)

(58) Field of Classification Search
CPC ...... G01N 27/622; G01N 21/01; G01N 21/03; G01N 21/31; G01N 21/75; G01N 21/76; G01N 21/1717; G01N 2021/0118; G01N 2021/752; G01N 2021/0325
See application file for complete search history.

(56) References Cited

FOREIGN PATENT DOCUMENTS

| CN | 112285097 A | * | 1/2021 | |
|---|---|---|---|---|
| CN | 114650883 A | * | 6/2022 | ............ B01L 3/5023 |

\* cited by examiner

*Primary Examiner* — David E Smith
*Assistant Examiner* — Hsien C Tsai
(74) *Attorney, Agent, or Firm* — Snell & Wilmer LLP (57) ABSTRACT

The present disclosure relates to a system and method for automatic online monitoring of dimethyl sulfide in environment. The method may realize separation of water vapor and the substance to be detected in accordance with the adsorption phase equilibrium principle of substance, thus eliminating the influence of water vapor on detection. The disturbance of other substances in an environmental sample can be eliminated in accordance with the charge or proton transfer principle of molecule ion reaction. Automatic online sampling, preprocessing and sample injection units are configured using valves, numerically controlled motor-driven injectors, flow controllers and a peristaltic pump, so that continuous online detection of DMS in an environmental water sample (e.g., seawater, or lake water) or a gas sample (e.g., atmosphere) can be realized.

10 Claims, 4 Drawing Sheets

SYSTEM AND METHOD FOR AUTOMATIC ONLINE MONITORING OF DIMETHYL SULFIDE IN ENVIRONMENT

TECHNICAL FIELD

The present disclosure belongs to the technical field of analysis of compounds, relates to a dimethyl sulfide monitoring technique, in particular to a system and method for automatic online monitoring of dimethyl sulfide in an environmental water or gas sample.

BACKGROUND

Sulfur cycle is one of the most important substance cycles in the world and has significant influence on global climate and environmental change. Reduced sulfides released from the ocean are a major source of biological sulfate aerosols and a major participant in sulfur cycle. Dimethyl sulfide (DMS, nmol $L^{-1}$) in seawater, apart from being mostly consumed by way of microbial degradation, photochemical oxidation, etc., will enter the atmosphere through the sea-air interface at a great exchange flux (nmol $m^{-3}$). Non-sea-salt sulfate (NSS-$SO_4^{2-}$) aerosol, the product of oxidization of DMS in the atmosphere, may be involved in the formation of cloud condensation nuclei (CCN), so that the formation process of clouds and the diffuse scattering coefficient of solar radiation are changed to reduce the terrestrial radiation level and the earth's surface temperature, resulting in negative feedback effect of DMS on the global climate (the CLAW assumption). At present, it is of great significance for further understanding of the sea-air exchange process of DMS to develop a new rapid field detection technique that can realize fast and accurate field monitoring of DMS in sea areas, which is prerequisite for improving the accuracy of sea-air DMS flux estimation.

The established detection methods for DMS in the ocean both at home and abroad include gas chromatography (GC) with flame photometric detection or fluorescent detection (FPD or FD), proton transfer/time-of-flight/atmospheric pressure chemical ionization quadrupole/plasma mass spectrometry (MS), ozone-induced chemiluminescence (OICL), etc. However, now there is still an urgent need for a method which features fast response, simple operation, small size of involved instruments and long-time field use to widely obtain data of DMS in the ocean.

SUMMARY

The present disclosure aims to provide a system and method for automatic online monitoring of dimethyl sulfide that feature fast response, simple operation and field use. The method may realize separation of water vapor and the substance to be detected in accordance with the adsorption phase equilibrium principle of substances, thus eliminating the influence of water vapor on detection. The disturbance of other substances in an environmental sample can be eliminated in accordance with the charge or proton transfer principle of molecule ion reaction. Automatic online sampling, preprocessing and sample injection units are configured using valves, numerically controlled motor-driven injectors, flow controllers and a peristaltic pump, so that continuous online detection of DMS in an environmental water sample (e.g., seawater, or lake water) or a gas sample (e.g., atmosphere) can be realized.

The present disclosure adopts the following technical solutions.

A system for automatic online monitoring of dimethyl sulfide in environment includes an online sampling and headspace generation assembly, an online sample processing assembly and an ion mobility spectrometer that are connected in sequence, where the online sampling and headspace generation assembly includes a peristaltic pump, an overflow bottle, a numerically controlled motor-driven injector, a NaOH bottle, a numerically controlled light-proof motor-driven injector, two tee-junctions, a headspace bottle, two two-way electromagnetic valves, a buffer bottle, four three-way electromagnetic valves, a gas pump, and a filter assembly; an inlet of the peristaltic pump is connected to an inlet pipe for water to be detected, while an outlet of the peristaltic pump is connected to an inlet of the overflow bottle by means of a pipe; an outlet of the overflow bottle is connected to a second tee-junction; the second tee junction is connected to a third three-way electromagnetic valve and a fourth three-way electromagnetic valve by means of pipes, respectively; the fourth three-way electromagnetic valve is connected to the numerically controlled motor-driven injector and a first tee-junction by means of pipes, respectively; the third three-way electromagnetic valve is connected to the NaOH bottle and a second three-way electromagnetic valve by means of pipes, respectively; the second three-way electromagnetic valve is connected to the numerically controlled light-proof motor-driven injector and the first tee-junction by means of pipes, respectively; the first tee junction is connected to an inlet of the headspace bottle by means of a pipe; a bubbling pipe is inserted into the headspace bottle and connected to the second two-way electromagnetic valve; an outlet of the headspace bottle is connected to an inlet of the buffer bottle by means of a pipe; two outlets of the buffer bottle are connected to a first two-way electromagnetic valve and a first three-way electromagnetic valve by means of pipes, respectively; the first three-way electromagnetic valve is connected to the gas pump and an inlet of the online sample processing assembly separately; the gas pump is connected to the filter assembly which is connected to a gas source; the online sample processing assembly is a perfluorosulfonate membrane tube, or a polytetrafluoroethylene tube or stainless steel tube filled with an desiccant or an adsorbent; and an outlet of the online sample processing assembly is connected to a test sample inlet of the ion mobility spectrometer.

In addition, the ion mobility spectrometer includes an air purifier, a flow control system composed of three flow controllers, a reagent molecule generator, a vacuum ultraviolet (VUV) lamp ionization source, an ion drift tube, and a data collecting and processing system; the air purifier is connected to the three flow controllers by means of gas pipes, respectively; the three flow controllers are connected to the second two-way electromagnetic valve, the reagent molecule generator and a drift gas inlet of the ion drift tube by means of gas pipes, respectively; the reagent molecule generator is connected to a carrier gas inlet of the ion drift tube by means of a gas pipe; and the ion drift tube is connected to the data collecting and processing system.

A method for online monitoring of dimethyl sulfide in environment based on the above system is provided, specifically including the following monitoring procedures:

allowing environmental air to pass through the filter assembly and the gas pump sequentially into the online sample processing assembly for removal of water vapor and then into the ion mobility spectrometer for detection;

during the detection of dimethyl sulfide (DMS) in the atmosphere, turning on the peristaltic pump to draw an environmental water sample into the overflow bottle until overflow, drawing, by each of the numerically controlled light-proof motor-driven injector and the numerically controlled motor-driven injector, a certain volume of water sample from the middle of the overflow bottle, followed by drawing, by the numerically controlled light-proof motor-driven injector, a set volume of NaOH solution, standing for several hours for alkaline hydrolysis of dimethylsulfoniopropionate (DMSP); meanwhile, moving the water sample in the numerically controlled motor-driven injector into the headspace bottle such that DMS in the water sample is stripped by bubbling into carrier gas within the headspace bottle and carried by the carrier gas continuously into the ion mobility spectrometer for detection, thus forming a mobility spectrum, while the water sample in the numerically controlled light-proof motor-driven injector is in the stage of alkaline hydrolysis; and after the completion of the alkaline hydrolysis of DMSP in the water sample, moving the water sample in the numerically controlled light-proof motor into the headspace bottle such that DMS from the alkaline hydrolysis of DMSP plus original DMS in the water sample is gradually stripped by bubbling into the carrier gas and carried by the carrier gas continuously into the ion mobility spectrometer for detection.

According to the present disclosure, an online sample processing assembly may be used to realize separation of water vapor and the substance to be detected in accordance with the adsorption phase equilibrium principle of substances, thus eliminating the influence of water vapor on detection.

According to the present disclosure, the disturbance of other substances in an environmental sample may be eliminated by improving the ionization selectivity with benzene as reagent molecules in accordance with the charge or proton transfer principle of molecule ion reaction.

The detected objects involve dimethyl sulfide (DMS) and precursor thereof dimethylsulfoniopropionate (DMSP) in an environmental water sample and DMS in an environmental gas sample, and the detection of DMSP in the water sample is indirect determination of the content of DMSP based on the detected quantity of DMS from the alkaline hydrolysis of DMSP.

The collection, injection and detection procedures of DMS and DMSP in an environmental water sample and DMS in the atmosphere may be programmed by data collection software, and the DMS sampling and detection procedures for a plurality of atmospheric samples and water samples are carried out by means of switching of the valve and pump systems during the alkaline hydrolysis of DMSP.

Two characteristic product ion peaks may be present in an ion mobility spectrum obtained by the detection of DMS. According to the present disclosure, the drift time of the two characteristic ion peaks under given conditions may be 3.72 ms and 4.56 ms, respectively.

Under optimum conditions, when quantitatively based on the intensities of the two characteristic ion peaks, the DMS detection sensitivity may be as low as 0.35 ppbv for a gas sample and 0.04 nmol/L for a water sample, respectively.

Basic principle of detecting DMS by ion mobility spectrometry: product ions from ionized DMS may have different drift coefficients under the action of an electric field due to their differences in mass and structure from reagent molecules and other substances, and hence differ in drift time of arrival at a detector, and then separation and analysis of DMS and other substances can be realized. The instrument involved in this technique may be small in size, portable and easy to integrate and have the characteristics of fast analysis, simple operation, etc. The method provided in the present disclosure, in terms of proton affinity (PA) and ionization energy (IE) of substance in positive ion mode, may select benzene (IE: 9.24 eV; PA: 750.4 kJ/mol) as reagent molecules, where the resulting characteristic ion peaks of benzene are reagent ions. In accordance with the principle that a substance having low IE and high PA is first ionized in positive ion mode, the characteristic ions of benzene may efficiently ionize DMS molecules (IE: 8.69 eV; PA: 830 kJ/mol) by means of charge transfer, and other disrupting chemicals in the environment such as carbonyl sulfide (IE: 11.18 eV; PA: 628.5 kJ/mol), carbon disulfide (IE: 10.07 eV; PA: 681.9 kJ/mol), methyl mercaptan (IE: 9.44 eV; PA: 773.4 kJ/mol) and hydrogen sulfide (IE: 10.45 eV; PA: 168 kJ/mol) can hardly be ionized and detected for being higher than benzene in IE and lower than benzene in PA. Thus, the disturbance of such chemicals in the detection of DMS in the environment can be eliminated. Under optimum conditions, the DMS detection sensitivity may be as low as 0.35 ppbv for a gas sample and 0.04 nmol/L for a water sample, respectively.

Elimination of disturbance of water vapor: a gas mixture containing the substance to be detected from stripping by bubbling may be first preprocessed online by a preprocessing system formed by a perfluorosulfonate membrane tube, or a polytetrafluoroethylene tube or stainless steel tube filled with a dry or highly adsorptive chemical, and separation of DMS molecules and molecules of water vapor can be realized based on differences between water molecules and the molecules of the substance to be detected in interaction with the perfluorosulfonate membrane or the dry or highly adsorptive chemical, thus eliminating the influence of water vapor on detection.

Determination principle of DMSP in an environmental water sample: the DMSP may be estimated based on the concentration of DMS converted from DMSP, where the conversion between DMSP and DMS occurs under a strong alkaline condition of pH≥13 in a ratio of 1:1:

$(CH_3)_2SCH_2COO^- \rightarrow (CH_3)_2S + CH_2 = CHCOO^- + H^+$
(pH≥13)

Advantages and Beneficial Effects of the Present Disclosure

1. With benzene as reagent molecules and the online preprocessing system, the present disclosure may eliminate the disturbance of environmental media such as other sulfur-containing compounds and water vapor without affecting the detection speed, and thus realize online sensitive detection.

2. The present disclosure establishes a system and method for automatic online detection of DMS compounds in environmental water samples (e.g., seawater and lake water) and atmospheric samples. The disturbance of other substances in the environment may be eliminated by means of reagent molecule-assisted ionization. Besides, the disturbance of water vapor to detection may be eliminated by means of online preprocessing using a perfluorosulfonate membrane and a dry or highly adsorptive chemical filled pipe, so that online rapid selective detection of DMS in the environment by ion mobility spectrometry can be realized.

DETAILED DESCRIPTION

The present disclosure will be further described in detail below with specific embodiments which are only illustrative rather than limiting and therefore cannot be used to limit the protection scope of the present disclosure.

Figure 1:
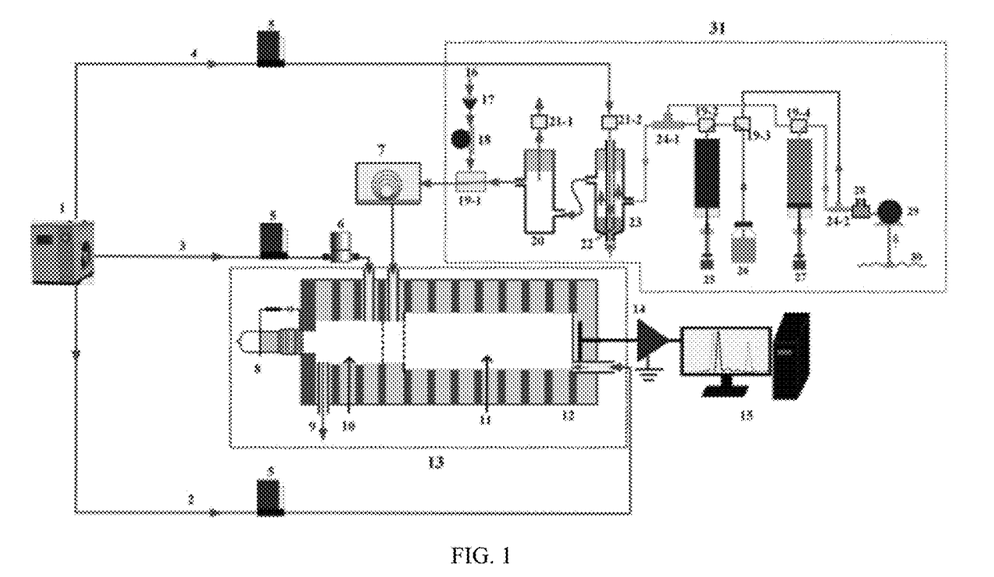
FIG. 1 is a structural diagram of a system according to an embodiment of the present disclosure.

A system capable of automatic online monitoring of dimethyl sulfide includes an online sampling and headspace generation assembly 31, an online sample processing assembly 7, and an ion mobility spectrometer 13.

The online sampling and headspace generation assembly includes a peristaltic pump 29, an overflow bottle 28, a numerically controlled motor-driven injector 27, a NaOH bottle 26, a numerically controlled light-proof motor-driven injector 25, tee junctions 24-1/24-2, a headspace bottle 23, a bubbling pipe 22, two-way electromagnetic valves 21-1/21-2, a buffer bottle 20, three-way electromagnetic valves 19-1/19-2/19-3/19-4, a gas pump 18, and a filter assembly 17.

An inlet of the peristaltic pump 29 is connected to an inlet pipe for water to be detected, while an outlet of the peristaltic pump 29 is connected to an inlet of the overflow bottle 28 by means of a pipe. An outlet of the overflow bottle 28 is connected to a second tee-junction 24-2. The second tee-junction 24-2 is connected to a third three-way electromagnetic valve 19-3 and a fourth three-way electromagnetic valve 19-4 by means of pipes, respectively. The fourth three-way electromagnetic valve 19-4 is connected to the numerically controlled motor-driven injector 27 and a first tee-junction 24-1 by means of pipes, respectively. The third three-way electromagnetic valve 19-3 is connected to the NaOH bottle 26 and a second three-way electromagnetic valve 19-2 by means of pipes, respectively. The second three-way electromagnetic valve 19-2 is connected to the numerically controlled light-proof motor-driven injector 25 and the first tee junction 24-1 by means of pipes, respectively. The first tee-junction 24-1 is connected to an inlet of the headspace bottle 23 by means of a pipe. The bubbling pipe 22 is inserted into the headspace bottle 23 and connected to the second two-way electromagnetic valve 21-2. An outlet of the headspace bottle 23 is connected to an inlet of the buffer bottle 20 by means of a pipe. Two outlets of the buffer bottle 20 are connected to a first two-way electromagnetic valve 21-1 and a first three-way electromagnetic valve 19-1 by means of pipes, respectively. The first three-way electromagnetic valve 19-1 is connected to the gas pump 18 and the online sample processing assembly 7 separately. The gas pump 18 is connected to the filter assembly 17 which is connected to a gas source.

Specific operation of this assembly may be as follows: an environmental atmospheric sample 16 is directly drawn into the online sample processing assembly by the gas pump. For the detection of DMS in an environmental water sample 30, a water sample is drawn into the overflow bottle by the peristaltic pump, and then a fixed volume of the water sample is drawn into the headspace bottle by the numerically controlled motor-driven injector. Subsequently, purified air is bubbled into the water sample, so that DMS gas is stripped from the water sample and carried by the purified air to pass through the buffer bottle into the online sample processing assembly. For the detection of DMSP (DMS precursor) in the water sample, firstly, a fixed volume of the water sample is drawn into the headspace bottle by the numerically controlled motor-driven injector. After the water sample is collected in the headspace bottle, a fixed volume of NaOH solution ($10$ mol·$L^{-1}$) is drawn and injected into the water sample in the headspace bottle by the numerically controlled light-proof motor-driven injector to react online without light for more than half an hour, and then the sample is injected into the headspace bottle by the numerically controlled light-proof motor-driven injector for subsequent detection procedure according to a headspace bubbling DMS injection process.

The online sample processing assembly 7 may be a perfluorosulfonate membrane tube, or a polytetrafluoroethylene tube or stainless steel tube filled with a dry or highly adsorptive chemical. The online sample processing assembly 7 is connected to a test sample inlet of the ion mobility spectrometer 13.

The ion mobility spectrometer 13 may include an air purifier 1, a flow control system composed of three flow controllers 5, a reagent molecule generator 6, a vacuum ultraviolet (VUV) lamp ionization source 8, an ion drift tube (having an air outlet 9, a reaction zone 10, a drift zone 11 and an enclosure heater 12), an amplifier 14 and a data collecting and processing system 15.

The air purifier 1 is connected to the three flow controllers 5 by means of gas pipes, respectively. The three flow controllers 5 are connected to the second two-way electromagnetic valve 21-2, the reagent molecule generator 6 and a drift gas inlet of the ion drift tube by means of gas pipes, respectively. The reagent molecule generator 6 is connected to a carrier gas inlet of the ion drift tube by means of a gas pipe. The ion drift tube is connected to the amplifier which is connected to the data collecting and processing system 15.

Reagent molecule benzene may be carried by carrier gas 3 into the VUV lamp ionization source, so that benzene molecules undergo photoionization under VUV light irradiation to generate reagent ions. On the other hand, charge transfer occurs between the reagent ions and the molecules of the object to be detected within the reaction zone to generate target product ions. The target product ions may be cyclically carried by carrier gases 3 and 4 into the reaction zone of the ion drift tube under the action of ion gate pulse, and different product ions may successively arrive at a detector for their differences in mass and structure under reverse interaction of drift gas 2, so that their signal peaks are detected. Thus, qualitative and quantitative analysis may be carried out based on the appearance time and intensity of each signal peak. A concentration vs ion peak intensity relationship may be obtained by measuring samples at a series of concentrations may be measured, and a dynamic quantitative response curve may be established, so that rapid online detection of DMS in an atmospheric sample and DMS and precursor thereof DMSP in an environmental water sample can be realized ultimately.

Figure 2:
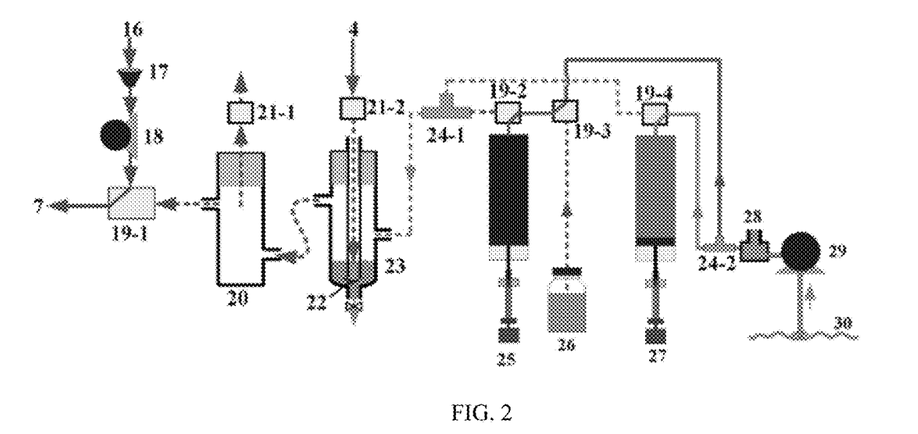
FIG. 2 is a schematic diagram showing online collection, injection and detection of a gas sample and drawing of a fixed volume of seawater by a numerically controlled motor-driven injector according to an embodiment of the present disclosure.
Figure 3:
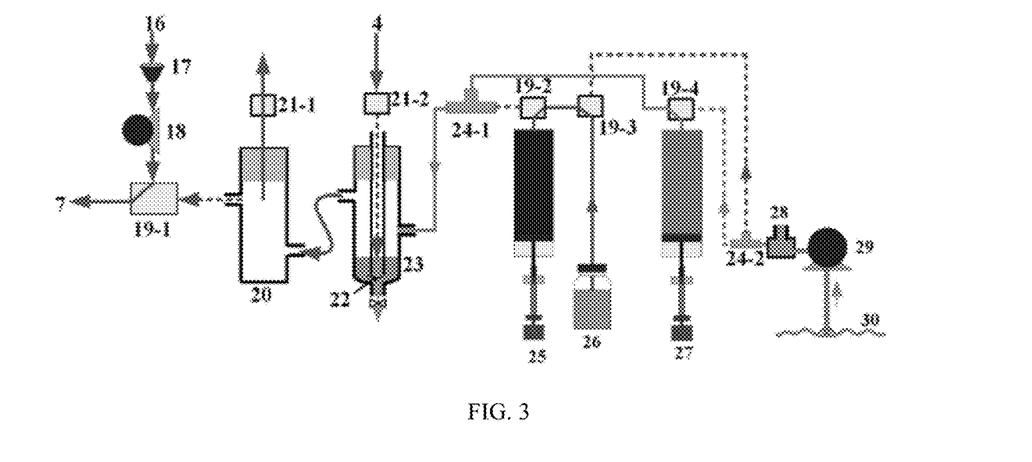
FIG. 3 is a schematic diagram showing online collection, injection and detection of a gas sample and feeding of seawater by one numerically controlled motor-driven injector while drawing a fixed volume of NaOH solution by the other numerically controlled motor-driven injector according to an embodiment of the present disclosure.

The collection, injection and detection procedures of DMS and DMSP in an environmental water sample and DMS in the atmosphere may be programmed by data collection software, and DMS in the atmosphere and DMS and DMSP in the environmental water sample may be detected in this order cyclically. Specific sampling and detection procedures of each sample may be as follows: Detection of a gas sample, and collection and conversion of a water sample: the first three-way electromagnetic valve 19-1 was switched to the atmospheric sampling port, and a gas sample was drawn by the gas pump 18 to pass through the filter unit into the sample preprocessing assembly at a flow rate of 200 mL/min, and then entered the ion mobility spectrometer system for detection after the online removal of environmental water vapor. During the detection of the gas sample, the peristaltic pump was turned on to draw an environmental water sample through a sampling head to the bottom of the overflow bottle, so that the water fully filled the overflow bottle until overflow, and then the three-way electromagnetic valve 19-2/19-3/19-4 was switched to the environmental water sample collecting port of the numerically controlled motor-driven injector 25/27 to draw a certain volume of water sample from the middle of the overflow bottle, specifically as shown in FIG. 2. Next, the three-way electromagnetic valve 19-3 was switched to draw NaOH solution, and the numerically controlled light-proof motor-driven injector was turned on to draw a set volume of NaOH solution. Finally, the uniform mixture obtained by shaking or under the action of gravity underwent alkaline hydrolysis of DMSP on standing for several hours. Meanwhile, the fourth three-way electromagnetic valve 19-4 was switched to the port for injecting the water sample into the headspace bottle 23, and the first two-way electromagnetic valve 21-1 was switched on to complete the injection and sampling procedures of the water sample, specifically as shown in FIG. 3.

Figure 4:
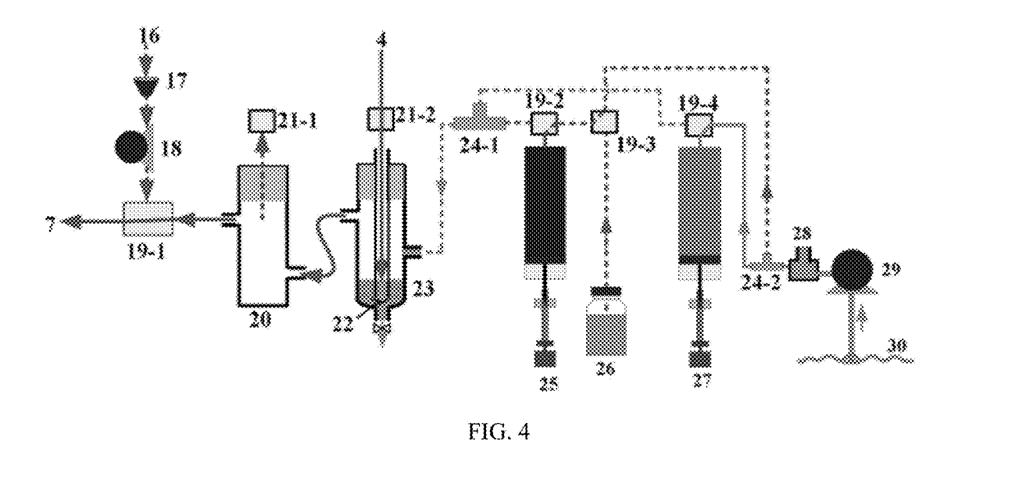
FIG. 4 is a schematic diagram showing stripping by bubbling and online headspace sample injection of DMS while converting DMSP in a water sample by alkaline hydrolysis in a numerically controlled light-proof motor-driven injector according to an embodiment of the present disclosure.

Detection procedure of DMS in the water sample: the fourth three-way electromagnetic valve 19-4 was switched to the environmental water sample collecting port, while the first two-way electromagnetic valve 21-1 off, the second two-way electromagnetic valve 21-2 on, and the first three-way electromagnetic valve 19-1 to the water sample injecting port. Carrier gas 4 was bubbled into the headspace bottle at a flow rate of 200 mL/min, so that DMS in the water sample was gradually stripped into the carrier gas and carried by the carrier gas continuously into the ion mobility spectrometer for detection. Thus, a mobility spectrum was formed, and a concentration C1 was obtained quantitatively based on the signal peak intensity. The time for completing the stripping of DMS in 5 mL of water sample by bubbling at the flow rate of 200 mL/min was about 3 minutes, and the time of peak appearing was about 15 seconds. At the same time, the water sample in the numerically controlled light-proof motor-driven injector was in the stage of alkaline hydrolysis, specifically as shown in FIG. 4. After the completion of the detection, the seawater in the headspace bottle was drained through the bottom control valve, and the cleaning procedure was initiated for next water sample detection cycle.

Figure 5:
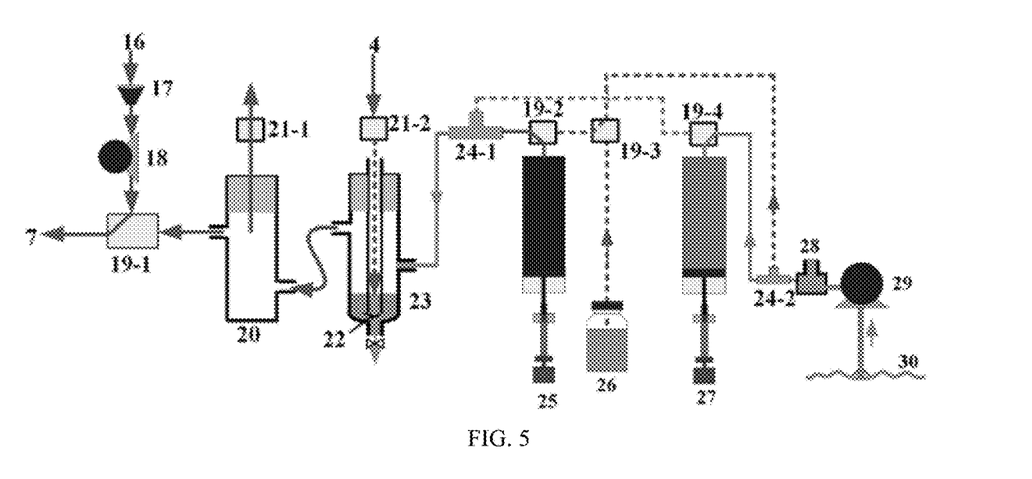
FIG. 5 is a schematic diagram showing injection of a water sample after alkaline hydrolysis into a headspace bottle by a numerically controlled light-proof motor-driven injector according to an embodiment of the present disclosure.
Figure 6:
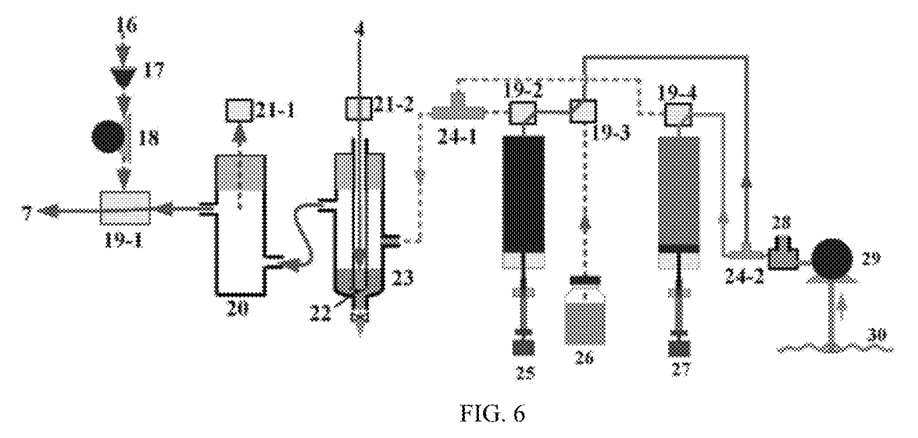
FIG. 6 is a schematic diagram showing stripping by bubbling and online headspace sample injection of DMS from alkaline hydrolysis of DMSP while drawing water samples by two numerically controlled motor-driven injectors according to an embodiment of the present disclosure.

Detection procedure of DMSP in the water sample: after the completion of the alkaline hydrolysis of DMSP in the water sample, the second three-way electromagnetic valve 19-2 was switched to the port for injecting the water sample into the headspace bottle, while the first two-way electromagnetic valve 21-1 was switched on and the numerically controlled motor-driven injector 25 was turned on to inject the water sample into the headspace bottle, as shown in FIG. 5. The first three-way electromagnetic valve 19-1 was switched to the water sample injecting port and the second two-way electromagnetic valve 21-2 was switched on. The carrier gas 4 was bubbled into the headspace bottle at the flow rate of 200 mL/min, so that DMS from the alkaline hydrolysis of DMSP plus original DMS in the water sample was gradually stripped into the carrier gas and carried by the carrier gas continuously into the ion mobility spectrometer for detection. Thus, a mobility spectrum was formed, and a concentration C2 was obtained quantitatively based on the signal peak intensity, specifically as shown in FIG. 6. The difference between C2 and C1 of the same water sample may be calculated as the concentration of DMSP in the water sample. After the completion of the detection, the seawater in the headspace bottle was drained through the bottom control valve, and the cleaning procedure was started for next water sample detection cycle.

The needed alkaline hydrolysis over a period of time in the detection of DMSP in the water sample allows for the DMS sampling and detection procedures for a plurality of atmospheric samples and water samples by means of switching of the valve and pump systems during this period.

Figure 7:
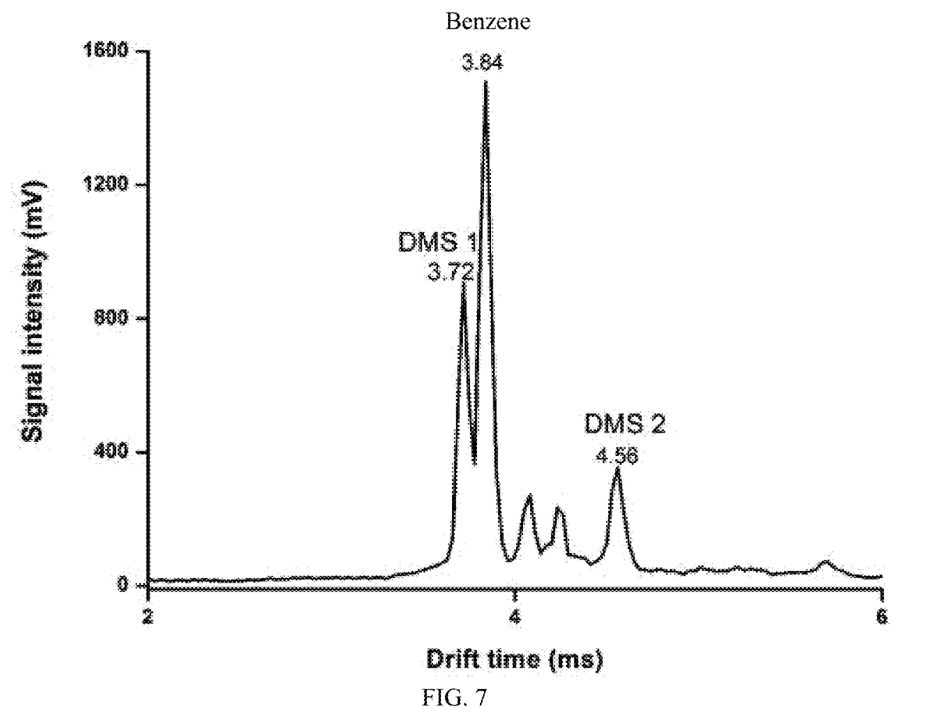
FIG. 7 is a schematic diagram of an ion mobility spectrum of DMS in artificially prepared 20 nmol/L DMS seawater according to an embodiment of the present disclosure.
Figure 8:
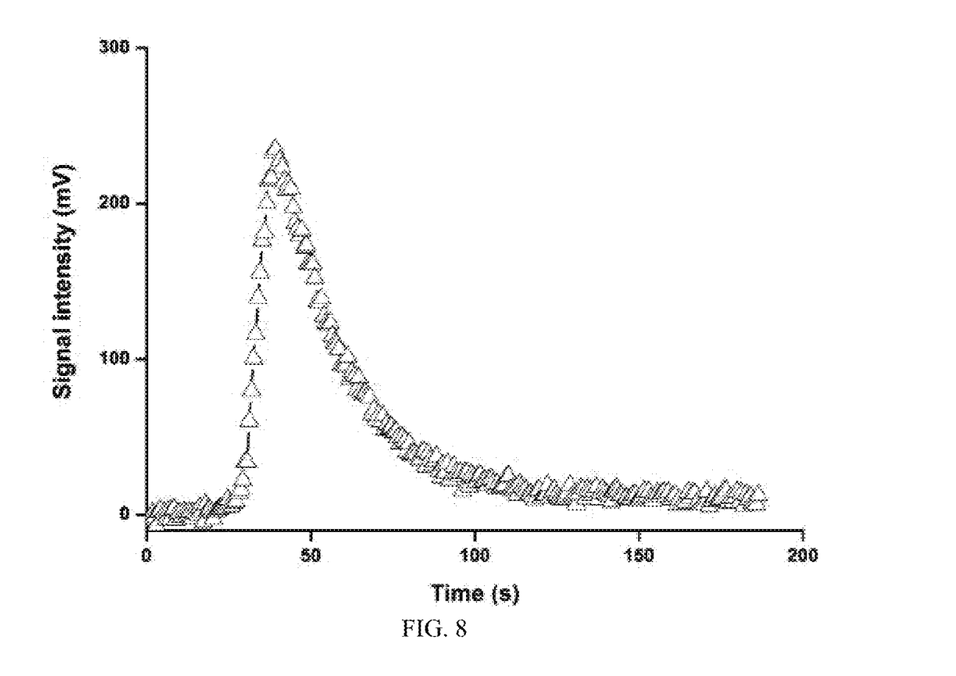
FIG. 8 shows a change curve of the ion peak intensity of DMS at 4.56 ms in 5 mL of 20 nmol/L DMS water sample at a bubbling flow rate of 200 mL/min.

The ion mobility spectrometer involved in the present disclosure may be a traditional uniform field mobility spectrometer. FIG. 7 shows an ion mobility spectrum of DMS in artificial 20 nmol/L DMS seawater sample. As can be seen from the spectrum, in positive ion mode with benzene as reagent molecules, the drift times of two product ion peaks of DMS are 3.72 ms and 4.56 ms, respectively. FIG. 8 shows a change curve of the ion peak intensity of DMS at 4.56 ms in 5 mL of artificial seawater sample detected after stripping by continuous bubbling of clean air at 200 mL/min and injection. As can be seen from the curve, the time needed for complete DMS stripping by bubbling in 5 mL of water sample and injection thereof for detection under this condition is about 2 minutes, and the time of peak appearing is about 46 seconds. When quantitatively based on the peak intensity of the ion peak, the time needed for the detection of a single water sample is 46 seconds.

The foregoing are merely descriptions of the preferred embodiments of the present disclosure. It should be noted that various variations and modifications can be made by those skilled in the art without departing from the concept of the disclosure, and these shall fall within the protection scope of the present disclosure.

What is claimed is:

1. A system for automatic online monitoring of dimethyl sulfide in environment, comprising an online sampling and headspace generation assembly, an online sample processing assembly and an ion mobility spectrometer that are connected in sequence, wherein the online sampling and headspace generation assembly comprises a peristaltic pump, an overflow bottle, a numerically controlled motor-driven injector, a NaOH bottle, a numerically controlled light-proof motor-driven injector, two tee-junctions, a headspace bottle, two two-way electromagnetic valves, a buffer bottle, four three-way electromagnetic valves, a gas pump, and a filter assembly; an inlet of the peristaltic pump is connected to an inlet pipe for water to be detected, while an outlet of the peristaltic pump is connected to an inlet of the overflow bottle by means of a pipe; an outlet of the overflow bottle is connected to a second tee-junction; the second tee junction is connected to a third three-way electromagnetic valve and a fourth three-way electromagnetic valve by means of pipes, respectively; the fourth three-way electromagnetic valve is connected to the numerically controlled motor-driven injector and a first tee-junction by means of pipes, respectively; the third three-way electromagnetic valve is connected to the NaOH bottle and a second three-way electromagnetic valve by means of pipes, respectively; the second three-way electromagnetic valve is connected to the numerically controlled light-proof motor-driven injector and the first tee-junction by means of pipes, respectively; the first tee junction is connected to an inlet of the headspace bottle by means of a pipe; a bubbling pipe is inserted into the headspace bottle and connected to the second two-way electromagnetic valve; an outlet of the headspace bottle is connected to an inlet of the buffer bottle by means of a pipe; two outlets of the buffer bottle are connected to a first two-way electromagnetic valve and a first three-way electromagnetic valve by means of pipes, respectively; the first three-way electromagnetic valve is connected to the gas pump and an inlet of the online sample processing assembly separately; the gas pump is connected to the filter assembly which is connected to a gas source; the online sample processing assembly is a perfluorosulfonate membrane tube, or a polytetrafluoroethylene tube or stainless steel tube filled with an desiccant or an adsorbent; and an outlet of the online sample processing assembly is connected to a test sample inlet of the ion mobility spectrometer.

2. The system for automatic online monitoring of dimethyl sulfide in environment according to claim 1, wherein
the ion mobility spectrometer comprises an air purifier, a flow control system composed of three flow controllers, a reagent molecule generator, a vacuum ultraviolet (VUV) lamp ionization source, an ion drift tube, and a data collecting and processing system; the air purifier is connected to the three flow controllers by means of gas pipes, respectively; the three flow controllers are connected to the second two-way electromagnetic valve, the reagent molecule generator and a drift gas inlet of the ion drift tube by means of gas pipes, respectively; the reagent molecule generator is connected to a carrier gas inlet of the ion drift tube by means of a gas pipe; and the ion drift tube is connected to the data collecting and processing system.

3. A method for online monitoring of dimethyl sulfide in environment based on the system according to claim 1, specifically comprising the following monitoring procedures:
allowing environmental air to pass through the filter assembly and the gas pump sequentially into the online sample processing assembly for removal of water vapor and then into the ion mobility spectrometer for detection;
during the detection of dimethyl sulfide (DMS) in the atmosphere, turning on the peristaltic pump to draw an environmental water sample into the overflow bottle until overflow, drawing, by each of the numerically controlled light-proof motor-driven injector and the numerically controlled motor-driven injector, a certain volume of water sample from the middle of the overflow bottle, followed by drawing, by the numerically controlled light-proof motor-driven injector, a set volume of NaOH solution, standing for several hours for alkaline hydrolysis of dimethylsulfoniopropionate (DMSP); meanwhile, moving the water sample in the numerically controlled motor-driven injector into the headspace bottle and then switching the electromagnetic valve such that DMS in the water sample is stripped by bubbling into carrier gas within the headspace bottle and carried by the carrier gas continuously into the ion mobility spectrometer for detection, thus forming a mobility spectrum, while the water sample in the numerically controlled light-proof motor-driven injector is in the stage of alkaline hydrolysis; and
after the completion of the alkaline hydrolysis of DMSP in the water sample, moving the water sample in the numerically controlled light-proof motor into the headspace bottle such that DMS from the alkaline hydrolysis of DMSP plus original DMS in the water sample is gradually stripped by bubbling into the carrier gas and carried by the carrier gas continuously into the ion mobility spectrometer for detection.

4. A method for online monitoring of dimethyl sulfide in environment based on the system according to claim 2, specifically comprising the following monitoring procedures:
allowing environmental air to pass through the filter assembly and the gas pump sequentially into the online sample processing assembly for removal of water vapor and then into the ion mobility spectrometer for detection;
during the detection of dimethyl sulfide (DMS) in the atmosphere, turning on the peristaltic pump to draw an environmental water sample into the overflow bottle until overflow, drawing, by each of the numerically controlled light-proof motor-driven injector and the numerically controlled motor-driven injector, a certain volume of water sample from the middle of the overflow bottle, followed by drawing, by the numerically controlled light-proof motor-driven injector, a set volume of NaOH solution, standing for several hours for alkaline hydrolysis of dimethylsulfoniopropionate (DMSP); meanwhile, moving the water sample in the numerically controlled motor-driven injector into the headspace bottle and then switching the electromagnetic valve such that DMS in the water sample is stripped by bubbling into carrier gas within the headspace bottle and carried by the carrier gas continuously into the ion mobility spectrometer for detection, thus forming a mobility spectrum, while the water sample in the numerically controlled light-proof motor-driven injector is in the stage of alkaline hydrolysis; and
after the completion of the alkaline hydrolysis of DMSP in the water sample, moving the water sample in the numerically controlled light-proof motor into the headspace bottle such that DMS from the alkaline hydrolysis of DMSP plus original DMS in the water sample is gradually stripped by bubbling into the carrier gas and carried by the carrier gas continuously into the ion mobility spectrometer for detection.

5. The method according to claim 3, wherein the ion mobility spectrometer uses benzene as reagent molecules.

6. The method according to claim 4, wherein the ion mobility spectrometer uses benzene as reagent molecules.

7. The method according to claim 3, wherein the online sample processing assembly formed by the perfluorosulfonate membrane tube or the polytetrafluoroethylene tube or stainless steel tube filled with the desiccant or the adsorbent is used to eliminate the influence of water vapor on detection.

8. The method according to claim 4, wherein the online sample processing assembly formed by the perfluorosulfonate membrane tube or the polytetrafluoroethylene tube or stainless steel tube filled with the desiccant or the adsorbent is used to eliminate the influence of water vapor on detection.

9. The method according to claim 3, wherein the DMS sampling and detection procedures for a plurality of atmospheric samples and water samples are carried out by means of switching of the valve and pump systems during the alkaline hydrolysis of DMSP.

10. The method according to claim 4, wherein the DMS sampling and detection procedures for a plurality of atmospheric samples and water samples are carried out by means of switching of the valve and pump systems during the alkaline hydrolysis of DMSP.

\* \* \* \* \*